United States Patent
McSherry

(10) Patent No.: US 7,464,045 B2
(45) Date of Patent: Dec. 9, 2008

(54) METHOD AND APPARATUS FOR MANAGING WORKPLACE SERVICES AND PRODUCTS

(75) Inventor: James McSherry, Boston, MA (US)

(73) Assignee: the workplace HELPLINE, LLC, Boston, MA (US)

( * ) Notice: Subject to any disclaimer, the term of this patent is extended or adjusted under 35 U.S.C. 154(b) by 1491 days.

(21) Appl. No.: 09/783,197

(22) Filed: Feb. 14, 2001

(65) Prior Publication Data

US 2002/0128891 A1      Sep. 12, 2002

(51) Int. Cl.
*G05B 19/418*      (2006.01)

(52) U.S. Cl. .......................................................... 705/8

(58) Field of Classification Search ...................... 705/8, 705/10; 379/265
See application file for complete search history.

(56) References Cited

U.S. PATENT DOCUMENTS

| | | | |
|---|---|---|---|
| 4,975,840 A | 12/1990 | DeTore et al. | |
| 5,182,705 A | 1/1993 | Barr et al. | |
| 5,471,382 A * | 11/1995 | Tallman et al. | 600/300 |
| 5,557,514 A | 9/1996 | Seare et al. | |
| 5,638,519 A | 6/1997 | Haluska | |
| 5,664,109 A | 9/1997 | Johnson et al. | |
| 5,666,493 A | 9/1997 | Wojcik et al. | |
| 5,712,984 A | 1/1998 | Hammond et al. | |
| 5,758,126 A | 5/1998 | Daniels et al. | |
| 5,806,043 A * | 9/1998 | Toader | 405/14 |
| 5,828,840 A | 10/1998 | Cowan et al. | |
| 5,829,001 A | 10/1998 | Li et al. | |
| 5,835,897 A | 11/1998 | Dang | |
| 5,862,223 A * | 1/1999 | Walker et al. | 705/50 |
| 5,867,665 A | 2/1999 | Butman et al. | |
| 5,870,562 A | 2/1999 | Butman et al. | |
| 5,875,431 A | 2/1999 | Heckman et al. | |

(Continued)

FOREIGN PATENT DOCUMENTS

| | | |
|---|---|---|
| DE | 0915422 A1 * | 12/1999 |
| EP | 0 952 539 A2 | 10/1999 |
| JP | 09-062740 | 3/1997 |
| JP | 00-011036 | 1/2000 |
| WO | WO 00/74193 A1 | 12/2000 |
| WO | WO 01/86928 A1 | 11/2001 |

OTHER PUBLICATIONS

Desmond, John P., It's the Customer, STUPID—CRM—Industry Trend or Event Software Magazine Apr. 1, 2000.*

(Continued)

*Primary Examiner*—Scott L. Jarrett
(74) *Attorney, Agent, or Firm*—The Law Offices of Paul E. Kudirka

(57) ABSTRACT

A small group of service providers, including specialists in various workplace issues, provides workplace services, such as human resource, legal, tax, accounting, environmental, financial, regulatory, governmental, technological, medical, consulting and marketing services to an organization by using a database of information concerning the organization and its contacts. An initial contact is made by a workplace resources office to the organization to gather background information on the contacts and the organization. The database is then initially populated with this background information. Later, when a situation arises that requires an answer to a specific workplace question, a contact places a telephone call to a specialist. The specialist accesses the database over a network and uses the pre-entered client-specific information to tailor advice to the specific question raised by the contact. The call and the response as categorized by the specialist are then stored in the database for later reference.

47 Claims, 8 Drawing Sheets

U.S. PATENT DOCUMENTS

| | | | |
|---|---|---|---|
| 5,884,032 A * | 3/1999 | Bateman et al. | 709/204 |
| 5,884,035 A | 3/1999 | Butman et al. | |
| 5,893,072 A | 4/1999 | Zizzamia | |
| 5,924,072 A | 7/1999 | Havens | |
| 5,950,169 A | 9/1999 | Borghesi et al. | |
| 5,970,464 A | 10/1999 | Apte et al. | |
| 5,983,369 A * | 11/1999 | Bakoglu et al. | 714/46 |
| 5,995,939 A | 11/1999 | Berman et al. | |
| 6,026,148 A * | 2/2000 | Dworkin et al. | 379/88.18 |
| 6,026,379 A | 2/2000 | Haller et al. | |
| 6,115,690 A | 9/2000 | Wong | |
| 6,230,287 B1 * | 5/2001 | Pinard et al. | 714/31 |
| 6,233,165 B1 * | 5/2001 | Irissou et al. | 363/97 |
| 6,366,925 B1 * | 4/2002 | Meltzer et al. | 705/6 |
| 6,449,355 B1 * | 9/2002 | Gutman | 379/265.01 |
| 6,461,162 B1 * | 10/2002 | Reitman et al. | 434/247 |
| 6,470,338 B1 * | 10/2002 | Rizzo et al. | 707/6 |
| 6,505,166 B1 * | 1/2003 | Stephanou | 705/8 |
| 6,510,431 B1 * | 1/2003 | Eichstaedt et al. | 707/10 |
| 6,523,010 B2 * | 2/2003 | Lauffer | 705/8 |
| 6,799,198 B1 * | 9/2004 | Huboi et al. | 709/203 |
| 6,839,707 B2 * | 1/2005 | Lee et al. | 707/8 |
| 6,895,573 B2 * | 5/2005 | Norgaard et al. | 717/100 |
| 2001/0032091 A1 * | 10/2001 | Schultz et al. | 705/1 |
| 2001/0054064 A1 * | 12/2001 | Kannan | 709/203 |
| 2002/0010616 A1 * | 1/2002 | Itzhaki | 705/9 |
| 2002/0010724 A1 * | 1/2002 | Sterling et al. | 707/530 |
| 2002/0019741 A1 * | 2/2002 | Heston | 705/1 |
| 2002/0022982 A1 * | 2/2002 | Cooperstone et al. | 705/7 |
| 2002/0026333 A1 * | 2/2002 | Endou | 705/3 |
| 2002/0029350 A1 * | 3/2002 | Cooper et al. | 713/200 |
| 2002/0123983 A1 * | 9/2002 | Riley et al. | 707/1 |
| 2002/0194014 A1 * | 12/2002 | Starnes et al. | 705/1 |
| 2005/0033602 A1 * | 2/2005 | Cirinna et al. | 705/1 |

OTHER PUBLICATIONS

Kalakota, Ravi, Marcia Robinson, e-Business 2.0: Roadmap for Success Addison Wesley Dec. 1, 2000 ISBN: 0-201-72165-1, Chapters 3, 5, 6, and 10.*

Harding, Elizabeth, Customer Service and Support Takes to the Web—Industry Trend or Event, Software Magazine, v18, n15, p. 56, Nov. 1998.*

Foley, John, Holding the Customer—Companies turn to data warehousing, automated call centers, Web sites, and integrated apps to keep customers smiling and buying—Industry Trend or Event, Information Week, n6761, p. 34, Mar. 2, 1998.*

EmployeeMatters Unveils Fully Integrated Web-Based service for Small and Medium Sized Businesses to Effectively Manage Employee Administration and HR Functions, Business Wire, Apr. 26, 2000.*

McCrary, Denna, CPA2BIZ Come Roaring into Town, California CPA, Oct. 2000.*

AmericanExpress.com, Small Business Services/Network, Apr. 1998, Archive.org, retrieved Oct. 28, 2004.*

Hodgson, Cynthia, Online Expert databases & services EContent, Dec. 1999, vol. 22, No. 6, pp. 48-53.*

Safehabor.com Introduces "ServiceSAM"—First Virtual Advisor for Customer Technical Support Mar. 6, 2000.*

SafeHarbor.com, a Web-Focused Customer Support Outsourcer, Joins Diamond Alliance Program Oct. 2000.*

Lounsbury, Erik, Gotta serve somebody Call Center CRM Solutions, Apr. 2000, vol. 18, No. 10, p. 56.*

DeVito, Nicholas J, Just a click away Black Enterprise, Feb. 2001, vol. 31, No. 7, p. 72.*

SafeHarbor.com—web pages Jun.-Nov. 2000, Retrieved Jun. 2, 2005 from www.archive.org.*

James Cortada et al., The Knowledge Management Yearbook 1999-2000 Butterworth-Heinemann, Apr. 6, 1999, ISBN: 075067122X.*

David Skyrme, Capitalizing on Knowledge: From E-Business to K-Business Butterworth-Heinemann, Jul. 1, 2001, ISBN: 0750650117.*

Price Waterhouse LLP, Introduces KnowledgeView Information Today, Jul./Aug. 1995, vol. 12, No. 7.*

Ernie and K-Man are Here to Answer your Questions The CPA Journal, Jul. 1996.*

Accounting firms make big hits on the Net International Accounting Bulletin, Sep. 1996, No. 194.*

Field, Tom, Help Yourself Webmaster Magazine, Mar. 1997.*

Arthur Anderson to launch web-based service for business executive—Knowledgespace CPA Journal, Dec. 1997, vol. 67, No. 12.*

Kaufman, Steve, Online Consulting Aids Small Business Knight-Ridder Tribune Business News, May 31, 1998.*

Callahan, Maureen, JobOptions and HealthWindows Form New Partnership HealthWindows, Jun. 28, 1998.*

Weiss, Jiri, Firms Package Knowledge to Go DestinationKM.com, Dec. 11, 2000.*

Baum, Biran, Ernie—four years of online consulting Consulting to Management, May 2000, vol. 11, No. 1.*

Litwin, Eric et al., The Evolution of Ernie—The Online Business Consultant University of Southern California, Jan. 15, 1998.*

Tiwana, Amrit, The Knowledge Management Toolkit Prentice Hall, Dec. 1999, ISBN: 0-13-12853-8.*

Watson, Ian, Applying Case-Based Reasoning: Techniques for Enterprise Systems Morgan Kaufmann, Jul. 1, 1997, ISBN: 1558604626.*

Meelo, John, A Shield for the Workplace Wars CFO, May 1998.*

ServiceSoft Delivers "Smart Answers" at Xerox Business Wire, Aug. 4, 1998.*

USA company The Human Resources Audit EIU ViewsWire, Apr. 25, 2001.*

Ackerman, Mark S., et al., "Answer Garden 2: Merging Organizational Memory with Collaborative Help", Proceedings of the ACM Conference on Computer-Supported Cooperative Work (CSCW'96), Department of Information and Computer Science, University of California, Irvine, California, BNSDOCID: <XP_2102511A_2_>.

* cited by examiner

METHOD AND APPARATUS FOR MANAGING WORKPLACE SERVICES AND PRODUCTS

FIELD OF THE INVENTION

This invention relates to methods and apparatus for providing workplace services and products, such as human resource, legal, tax, accounting, environmental, financial, regulatory, governmental, technological, medical, consulting and marketing services and products, to a large group of subscribers from a small number of service providers and for generating summary reports from information on issues gathered from customer help inquiries and responses.

BACKGROUND OF THE INVENTION

Most businesses today face a growing number of complex issues that must be resolved. These include human resource, legal, tax, accounting, environmental, financial, consulting, marketing and other issues, many of which must be recognized and responded to in the course of day-to-day operations. Not only are these issues complex, but many issues require specialized expertise in order to adequately address them. The failure to respond to some issues may result in further expense and potential legal problems. For example, In recent years there has been a dramatic rise in employment actions against employers, including harassment, discrimination and wrongful termination actions, by employees. Although it takes only a short time for an employee to make a claim, the employing organization must spend many hours of its own time plus attorney time, to respond to that claim. Many of the claims are eventually dismissed due to lack of merit, but defending against claims without merit still costs employers millions of dollars in legal fees, lost staff time and productivity. Consequently, it would clearly be to the advantage of employers to investigate and address potential employment action issues before they escalate into claims or legal action.

However, many employers are ill equipped to proactively respond to these issues, and other workplace issues, in order to anticipate and prevent legal actions by employees, in order to save money and to comply with various regulations. Though large employers can afford to employ a full time workplace services staff, including human resource and legal staffs, in order to receive and deal with issues before the complaints become employment actions, many times the workplace services staff draw on outside resources for mentoring and "second opinion" purposes. Smaller employers cannot afford to hire a full time staff. Consequently, they have relied on outside consultants, industry groups, or trade associations. Typically, these latter organizations have used two approaches to dealing with employment problems. The first of these approaches uses seminars and meetings to discuss potential problems and to heighten employer awareness of workplace issues. The problem with this approach is that the seminars and meetings generally occur before an actual situation has arisen and thus they cannot deal with the specifics of any given situation. The second approach is to provide expertise and advice to employers after an issue has arisen.

Neither of these approaches is ideal since neither deals with specific situations at the stage where they can be dealt with before significant expenses are incurred. A further approach is to contract with human resource, legal and other consultants to provide support in an "on call" basis so that help is available to deal with situations as they arise. However, this latter approach is relatively expensive.

A second part of the problem is dealing with workplace issues proactively. It would be desirable to anticipate trends and problems and address those issues where problems are likely to arise in the future. For example, insurers who must often pay for legal expenses and claims are also interested in information concerning workplace issues, complaints and their resolution, both for the purposes of avoiding legal action, and for tailoring premiums and offering coverage for areas of new concern. However, privacy concerns generally prevent insurers from pooling information in order to obtain overall views of an area. The alternative is to obtain information from surveys and questionnaires. However, the response rate to such surveys is poor and it is difficult to predict trends from surveys and questionnaires. There is currently no effective method for obtaining information relating to potential claims and their resolution for persons other than customers of a particular company.

Further, many other workplace issues arise which often require the assistance of experts and consultants with expertise in a specific area. These issues include legal tax, accounting, environmental, financial, consulting and marketing issues among others. There are few employers who can maintain a staff of in-house experts on all of these issues just in case the issues should arise. Therefore, it is often necessary to contact experts after an issue has arisen.

Therefore, there is a need for a mechanism to provide workplace assistance to all sizes of employers in a cost effective manner to enable them to deal timely with specific situations. Further, there is a need for a mechanism for gathering data over a large universe of employers concerning workplace issues, complaints and related matters.

SUMMARY OF THE INVENTION

In accordance with the principles of the invention, a method and apparatus allows a small group of service providers, including workplace resource specialists, experts and consultants, to provide services to a large group of employers. The apparatus includes a database of information concerning the employers and their contacts. The database also includes information identifying employer contacts.

In one embodiment, each contact is assigned a unique ID code as g identifying information. When a situation arises that requires workplace services, a contact places a telephone call to a predetermined "help line" telephone number. A specialist answers the call and receives the unique ID code from the contact. When the received ID code is entered into the database, information concerning the employer is displayed to the specialist. This information may include, for example, the location of the employer, its size, number of employees, etc. This employer-specific information allows the specialist to tailor advice to the specific question raised by the contact.

In accordance with another embodiment, contacts may also be identified by name, company, telephone number and e-mail address or other similar information.

In another embodiment, when a situation arises that requires workplace services, a contact uses identifying information such as a unique ID to log onto a restricted access web site and generates an e-mail message to the specialist. A specialist receives the e-mail message and receives the unique ID code or other identifying information from the message. When the received identifying information is entered into the database, information concerning the employer is displayed to the specialist. The specialist can then respond to the inquiry via an e-mail message. Since the initial inquiry e-mail message and the responding e-mail messages are stored in the database, the specialist can generate follow-up e-mail messages to the contact at later dates.

In accordance with still another embodiment, both the questions raised by the contact and the response given by the specialist are placed into predefined categories by the specialist at the time that the response is made. The call or e-mail message, the response and these categories are then stored in the database for later reference.

In accordance with still another embodiment, when a contact call or e-mail message is received, the inventive system displays previous calls or e-mail messages made by the same contact or contacts employed by the same employer and the responses given to the specialist at the time the specialist is responding to a call or e-mail message in order to place the communication in context.

In accordance with yet another embodiment, queries and reports can be run across all stored calls, e-mails, responses and categories in order to provide an overview of developments in selected areas in order to provide summaries to customers, such as insurers. Thus, useful information concerning the state of a particular area is developed directly from actual information in the form of contemporary inquiries and requests for service. Since these reports contain no information identifying individual customers, there are no privacy concerns.

BRIEF DESCRIPTION OF THE DRAWINGS

The above and further advantages of the invention may be better understood by referring to the following description in conjunction with the accompanying drawings in which.

DETAILED DESCRIPTION

Figure 1:
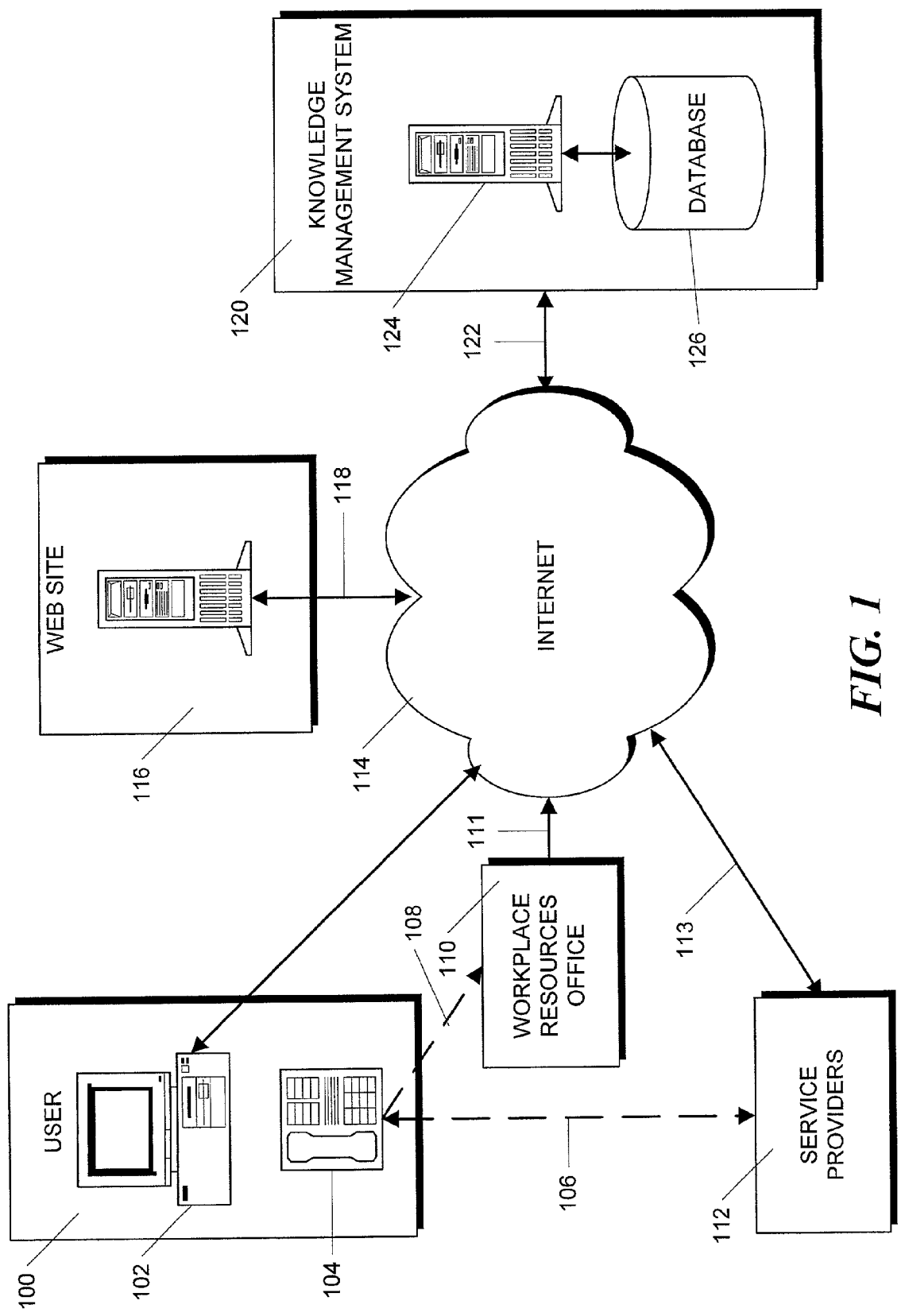
FIG. 1 is a schematic block diagram illustrating the construction of the overall system.

FIG. 1 illustrates, in a schematic form, the overall organization and structure of a workplace services management system constructed in accordance with the principles of the invention. This system allows a contact person 100 associated with a client of the system to access general workplace service information displayed on a web site 116 by means of a computer 102 and internet 114 as indicated by arrow 122. The contact person may also optionally use web site 116 to register with the system and receive a personal ID code that allows the contact person to receive additional information and assistance from the system. For example a registered contact person 100 may use the personal ID code to enter a restricted area in the web site 116 to contact a specialist at service provider 112 by means of e-mail messages as described below.

The web site 116 can be a stand alone web site that receives information from the knowledge management system 120 or it may be part of the knowledge management system 120. In this case, the user 100 would directly access the knowledge management system via a web interface (not shown) which is configured to appear as a web site. In this manner, the web site can be dynamically generated by the knowledge management system 120 so that changes can rapidly be made to web site appearance and content.

Alternatively, a registered contact person 100 may directly contact a specialist at service provider 112 by means of a telephone 104 and telephone link 106 in order to obtain specific advice regarding a particular question. Illustratively, telephone link 106 might be a toll-free or WATS line. After the specialist has been contacted, he may receive additional information in order to identify the contact person and retrieve information from the knowledge management system 120. This additional information may include the contact's personal ID code, name, company, telephone number or e-mail address.

Contact person 100 may also interact with a workplace resources office 110 by means of a telephone link 108 that may also be toll-free. The workplace resources office telephone link 108 can be used by workplace resources office personnel to obtain registration information for a client and associated contact persons and to transmit the personal ID code necessary to allow the client contact persons to access service providers 112.

Both the workplace resources office 110 and the service providers 112 access knowledge management system 120 in order to retrieve and store information regarding clients and workplace problems and concerns. Knowledge management system 120 comprises a server 124 and a knowledge database 126. The content and construction of database 126 is described in detail below.

Service providers 112 interact with the knowledge management system 120 by means of the Internet as indicated by link 113 and a web interface with server 124 (not shown.) In accordance with the principles of the invention, this link allows experts and specialists located at service providers 112 to obtain detailed information concerning a client, client contact persons and associated data at the time that the specialist is talking to the contact person. In particular, when a contact person contacts a specialist at a service provider 112, the specialist might access knowledge management system 120, via the internet 114, to obtain relevant data necessary to allow the specialist to answer a specific question posed by client contact 100.

Advantageously, the information presented to the specialist by knowledge management system 120 allows the specialist to provide an accurate response although the specialist might be in a completely different location, such as a different state, than the client. In addition, previous calls and e-mail messages generated by the specific contact person 100 who has placed the telephone call are also displayed to a specialist in the service provider 112. This allows the specialist to place the current call in context with other calls made from the same organization. The provision of this background information to the specialist in real time during the contact call, in turn, allows a small number of specialists located at a particular geographical location to provide services to a large number of clients and client contact persons who may be distributed over a wide geographic area.

Figure 2:
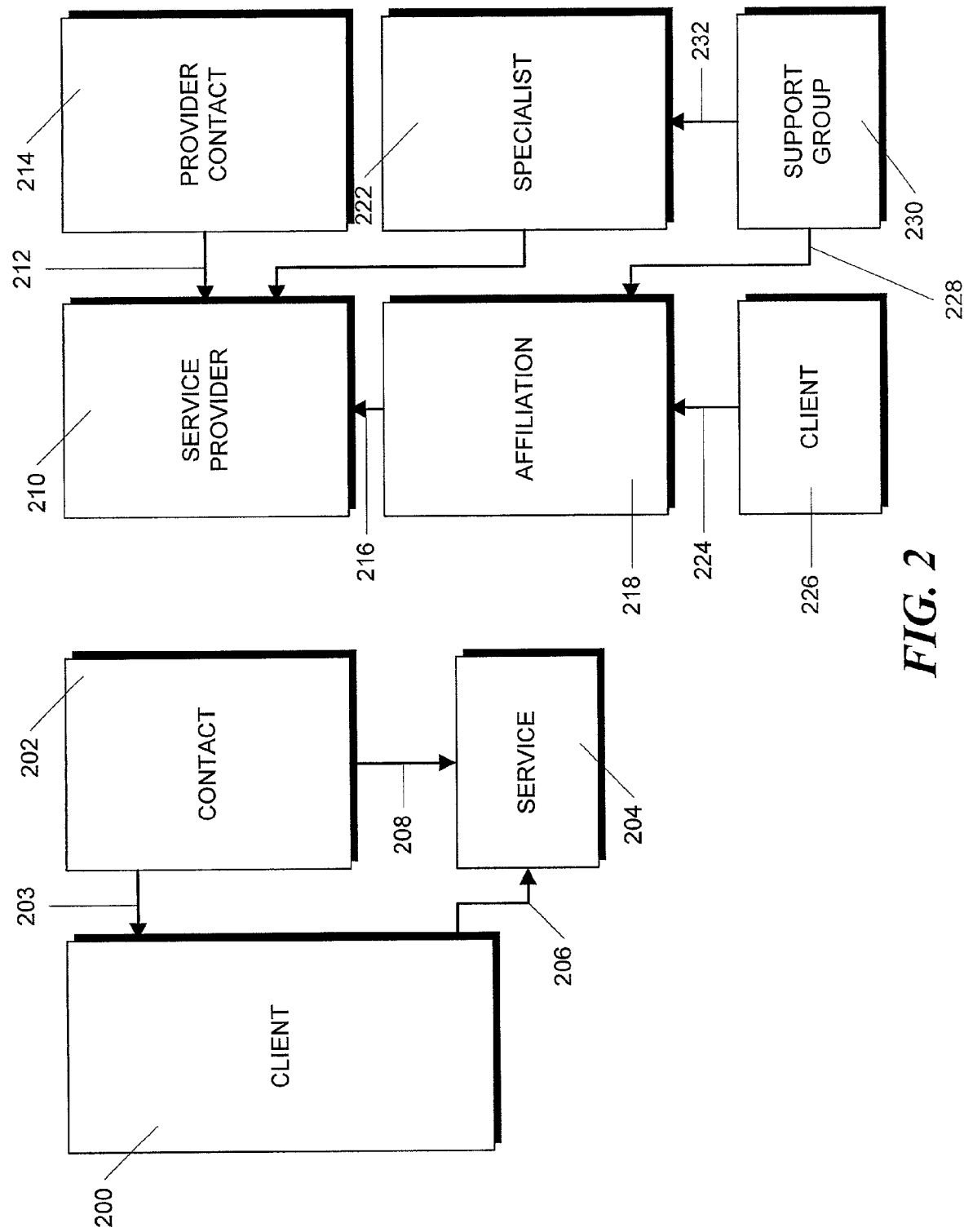
FIG. 2 is a schematic diagram illustrating the layout of the client and service provider fields in the knowledge management system database.

The knowledge database may be implemented in a conventional relational database system. FIG. 2 illustrates selected tables in the database 126 and the relationships between the tables. Each table represents an element of the workplace services system and contains information relating to that element. For example, clients are represented by a client table 200, which is related to a contact table 202 and a service table 204. The client table 200 includes a plurality of records, each of which represents a single client. Each record is, in turn, comprised of fields which store information about the client, including, for example, the client's name, the client's address, the number of client locations, the number of employees at each client's location, the client's web site address, whether the client has workplace issue expertise on staff and a primary contact ID. Each record also includes a field that includes a client ID that uniquely identifies the client and serves as a "key" or index into the client table. The records in the client table may be indexed by one or more other indices in a conventional manner.

The contact table 202 is related to the client table 200 by a key relationship. In particular, each record in the contact table 202 includes a field that holds a client ID that ties the contact to a particular client record in table 200. Each record in the contact table may also include a plurality of additional fields, which may include the contact's name, address, telephone number and other information. Each contact record also includes a contact personal identification number (PIN) that is used to identify the particular contact to the system and is a key that can be used to access the contact record.

Each client is provided with a specific level of service. The details of various levels of service are stored in the knowledge management database in the service table 204. In particular, the service table 204 is related to the client table 200 and the contact table 202, as indicated by arrows 206 and 208. Each record in the service table includes a service ID, as well as a client ID and a contact ID that relates a particular service to both the client and the contact. This allows a level of service to be given to a client and an individual level of service to be given to each client contact.

Service providers are also represented by a plurality of tables in the knowledge management database 126. Each record in service provider table 210 includes information regarding the service provider including its name and address and a unique service provider ID. Provider contacts at each service provider are represented by records in table 214, each of which includes the service provider ID which relates the provider contact table 214 to the service provider table 210, as indicated by arrow 212. In addition, the contact table 214 may include the contact's name and address, telephone numbers, fax numbers, etc.

Services are actually provided by the service providers by means of specialists represented by table 222. Aside from a specialist ID, each record in the specialist table includes the service provider ID and details, such as the specialist's name, address, telephone number, fax number, e-mail, etc. The service provider ID relates the specialist table 222 to the service provider table 210, as indicated by arrow 220.

Each service provider represented by a record in table 210 is also associated with an "affiliation." Affiliations are represented by records in table 218. Each record in affiliation table 218 includes an affiliation ID and the affiliation name, address, number of affiliated entities, the affiliation and it's location. In particular, the affiliation is also associated with the service providers represented by table 210, as indicated by arrow 216, by means of a dictionary file or other similar arrangement. The clients, represented by table 200, may also be associated with affiliations 218. In particular, each record in the client table 200 may include an affiliation ID to associate the client with an affiliation in table 218, as indicated by arrow 224.

In addition to affiliations, clients may belong to support groups represented by table 230. Each record in support group 230 may have a support group ID, name and an affiliation ID. The support group table 230 is thus tied to the affiliation table 218, as indicated by arrow 228. In addition, support groups represented by table 230 may also be associated with specialists, represented by table 222, with a conventional key arrangement as indicated by arrow 232.

Figure 3:
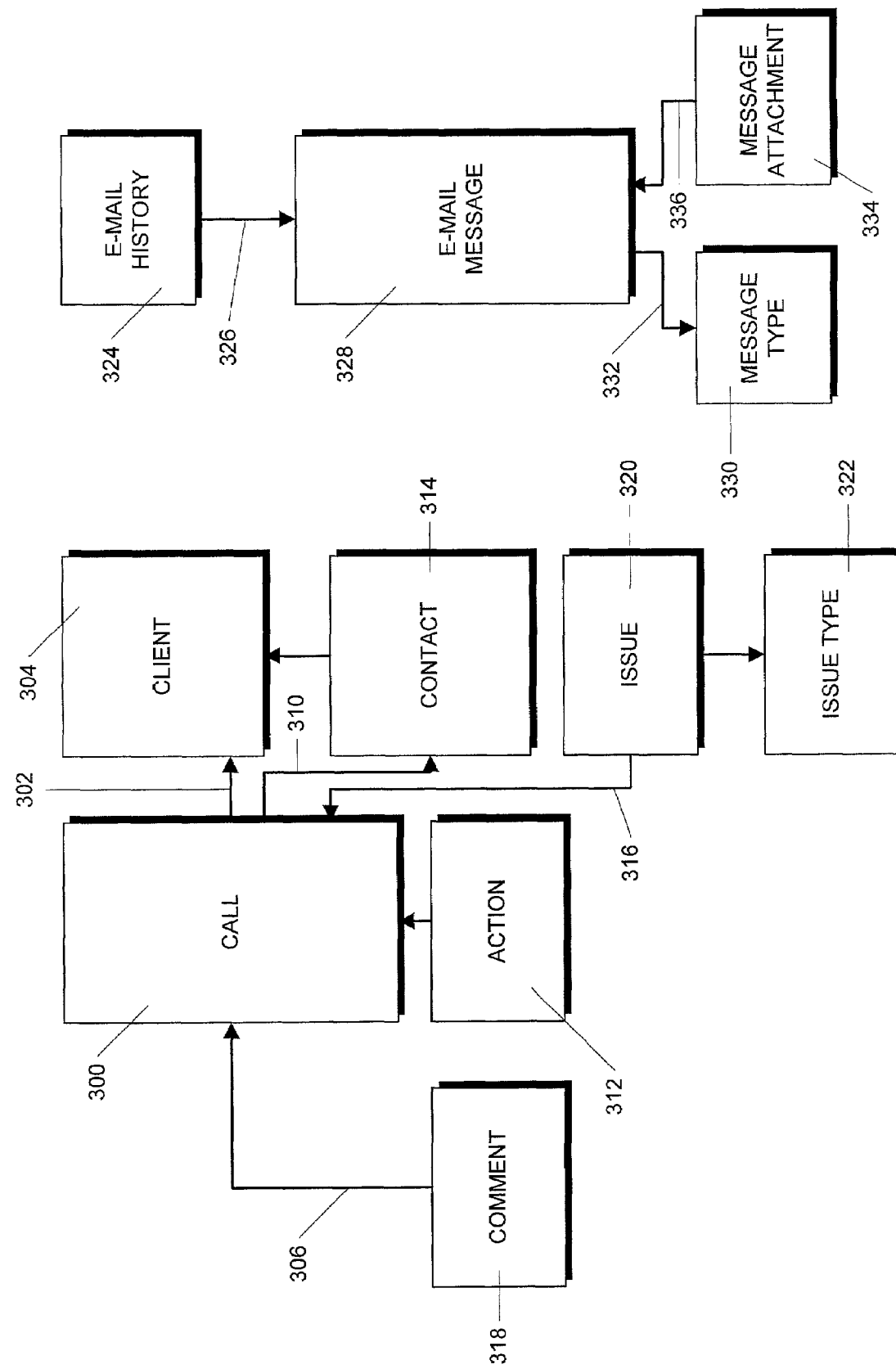
FIG. 3 is a schematic diagram illustrating the layout of the call and e-mail message tracking fields in the knowledge management system database.

In addition to each client and service provider, the knowledge management database also contains a set of tables that are used to represent calls and e-mail messages generated by client contacts to specialists at the service providers. This set of tables is indicated in FIG. 3. In particular, each call is represented by a record in call table 300. Each such record may include such information as unique call ID, a client ID associated with the client contact who generated the call, a contact ID associated with the contact that generated the call, the subject, the type, status, start and end dates, duration, background information, the actual question that was the subject of the call, the response generated and other information which may be useful to a specialist in reviewing a subsequent call.

Each call is associated with an action represented by a record in action table 312. The actions are predetermined response characterizations that are selectable by the specialist upon responding to a call. Since the call action is selected from a set of predetermined categories, different calls handled by different specialists may still be compared and used to generate reports that encompass different clients and contacts. Each record in table 312 might include, for example, a unique action ID and action name. Further, each entry in call table 300 is also associated with a comment, represented by a record in comment table 318. The comment table may include such things as a unique call comment ID, comment date, comment type, information concerning any e-mail messages that might have been sent to the client including e-mail addresses, author, subject, text, sent date, comment duration, whether the response was an original response or a subsequent response. Each entry in the comment table also includes a call ID so that the comment table is related to the call table, as indicated by arrow 306.

Each call represented by a record in table 300 also concerns an issue that is represented by a record in issue table 320. As with actions, issues may be selected from a set of predetermined types represented by table 322 by the specialist during the response to a client contact call. The use of predetermined types allows each call to be placed in a predetermined category so that meaningful statistics can be generated in the categories as will hereinafter be described.

Table 328 represents e-mail messages and each message is represented by a record in the table. Each such record may include such information as a unique message ID, the subject, from and to people, the type, text, date and e-mail address. Other information, which may be useful to a specialist in reviewing a subsequent e-mail message, may also be included. As with the call action and issue tables, e-mail message types may be selected from a set of predetermined types represented by table 330 by the specialist during the response to a client e-mail message. The use of predetermined types allows each message to be placed in a predetermined category so that meaningful statistics can be generated in the categories as will hereinafter be described. The message type table 330 is linked to the message table 328 by a message Id as indicated schematically by arrow 332.

In a similar manner, e-mail message attachments can also be tracked via table 334 which is linked to both the message table 328 and the type table 330 by ID keys as indicated by arrow 336. Each record in the attachment table represents attachment and stores such information as the name, position, type and source of the attachment.

An e-mail history table 324 is also linked to the message table 328 as indicated schematically be arrow 326. The history table 324 holds a record for each message and stores such information as the date sent, the message format, the to person and address and whether any errors were encountered. Together, the e-mail tables allow a dialog to be carried on between a client contact and a specialist. In particular, since all e-mail messages are tracked questions posed by a contact person 100 to a service provider 112 via e-mail through the web site 114 can be tracked as well as the subsequent response and any follow-up. Information on each message is stored. In addition, the stored information allows the specialist to forward a special follow-up message to the client contact after a set period to inquire whether the contact is satisfied with the initial response. This special follow-up message provides for enhanced client satisfaction.

Because all of the tables are interlinked, when one of the tables is accessed, the remainder of the information is retrieved. For example, when a client contact places a telephone call to a workplace resource specialist, the specialist may receive an ID code from the contact. This ID code can be used to retrieve all of the linked information.

Figure 4:
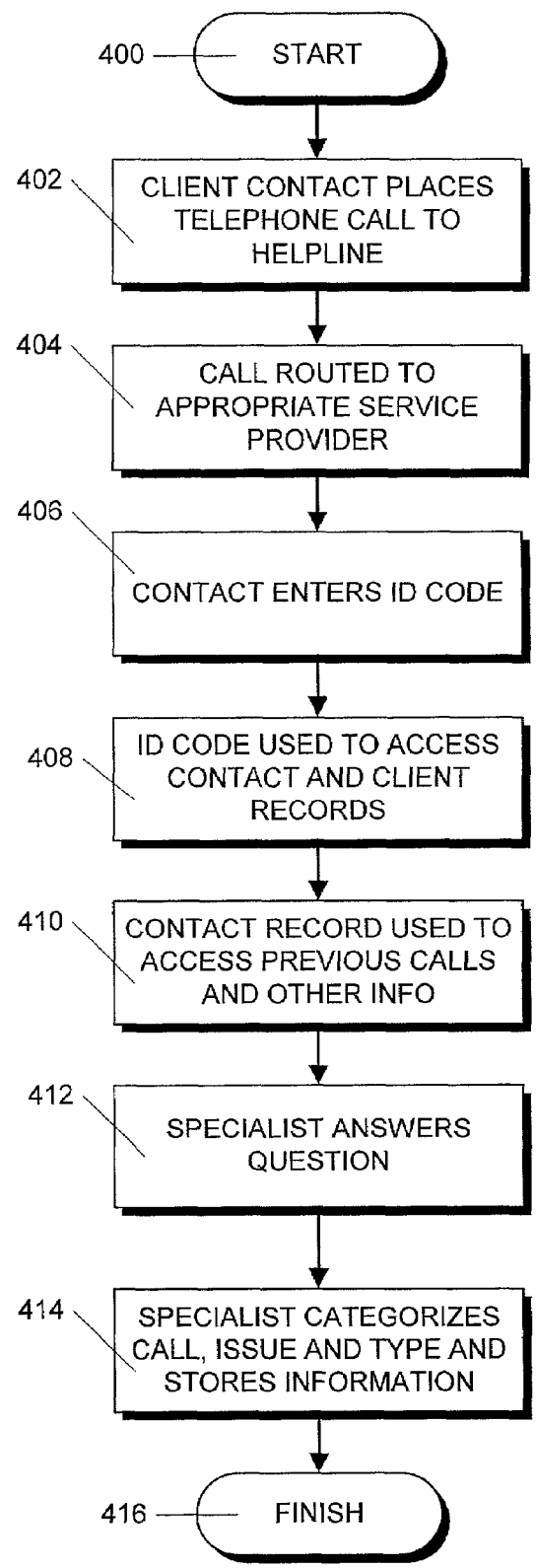
FIG. 4 is a flowchart showing the steps in an illustrative process for servicing telephone calls to a help line.

FIG. 4 is a flowchart that illustrates the steps performed when a client contact places a telephone call to a workplace issue "help" line. This process starts in step 400 and proceeds to step 402 where the client contact places the telephone call to the help line. Next in step 404, the call is routed to an appropriate service provider based on the telephone number dialed by the client contact. In step 406, the client contact enters an ID code, such as a PIN number, by either informing the specialist that answers the telephone call, or by entering the ID number, for example, on a touch tone telephone or other conventional mechanism.

Next in step 408, the ID code is used to access the contact and client records in the appropriate knowledge management database tables. In particular, the specialist enters the ID code into a local computer that is connected to the knowledge management database, via the Internet. The contact and client records are then returned to the local computer and displayed on the specialist's screen. In step 410, the contact record is used to access previous calls and other related information from the knowledge management database. This related information might optionally also be displayed on the specialist's screen.

Next in step 412, the specialist provides a response to the question. As a follow up, in step 414, the specialist categorizes the call issue and type and stores this information in the knowledge management database over the Internet connection for further reference should the same client contact place other calls to the specialist or another specialist at the service provider. The process then finishes in step 416.

Figure 5:
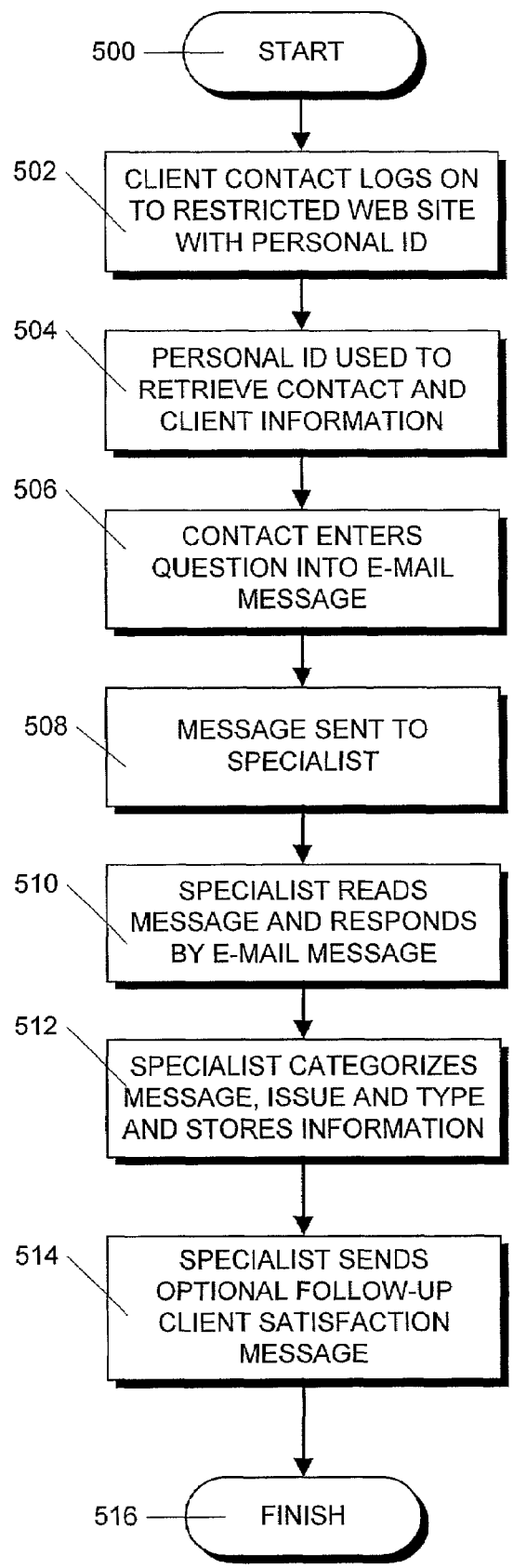
FIG. 5 is a flowchart showing the steps in an illustrative process for servicing client contact questions via e-mail messages.

FIG. 5 is a flowchart that illustrates the steps performed when a client contact generates an e-mail message to a specialist. This process starts in step 500 and proceeds to step 502 where the client contact logs onto a restricted web site using a personal ID code or other identifying information in order to gain access to the web site. This identifying information would be obtained as described below in connection with FIG. 6. This web site may be one of the web sites discussed below in connection with FIG. 6 or a special web site designed to accept client inquiries.

Next, in step 504, the identifying information entered by the client contact is sent to the knowledge management system and used to retrieve the client's information including the e-mail address of the specialist assigned to the client contact. This information is used to complete most of the fields in the e-mail message, including the e-mail address of the specialist (these fields may not even be visible to the contact.) In step 506, the client contact enters the question for which a response is desired into an appropriate text field in the e-mail message. This might be done, for example, by selecting one of a plurality of "Do you have a question?" button which have been pre-positioned on the web site display.

Next in step 508, the e-mail message is posted to the specialist, for example when the contact actuates a "submit" button. The contact may optionally be requested to verify that the information retrieved from the knowledge management database is still accurate and, if not, may be given an opportunity to correct the information via an on-line form. Changed information will be sent to the workplace resources office in order to update the knowledge management database. In one embodiment, the specialist directly receives the e-mail message posted by the contact. In this embodiment, in step 510, the specialist receives the e-mail message and accesses the knowledge management system using information in the e-mail, such as the name, company, e-mail address, etc. In particular, the specialist can access previous e-mails, calls and other related information from the knowledge management database. This related information might optionally be displayed on the specialist's screen.

In another embodiment, the e-mail message is sent to the knowledge management system. The message may be entered by the knowledge management system into the database directly or may be converted into a database record by the knowledge management system. Either the e-mail messages or the database record representing the e-mail messages is then listed in an "Incomplete calls/E-mails list." At this point optionally, an e-mail message might be sent to the specialist informing him that a new question has arrived. Then, when the specialist logs onto the knowledge management system, the e-mail message will appear with the client and contact information already available and displayed at the specialist's local terminal.

Next in step 510, the specialist examines the e-mail message and provides a response, via e-mail, to the question posed in the message. The specialist may also attach relevant documents and information to the responding e-mail in a conventional manner. As a follow up, in step 514, the specialist categorizes the e-mail issue and type and stores this information in the knowledge management database over the Internet connection for further reference should the same client contact generate other e-mails or place other calls to the specialist or another specialist at the service provider.

Optionally, in step 514, the specialist may send a follow-up message, via e-mail, to the contact's e-mail address that is now stored in the knowledge management database. This optional follow-up message can be used to inquire whether the previous response adequately answered the client's question or to elicit further information. In addition, the contact that has already received the specialist's reply can also generate a further e-mail message if the reply was not sufficient. The process then finishes in step 516.

Figure 6:
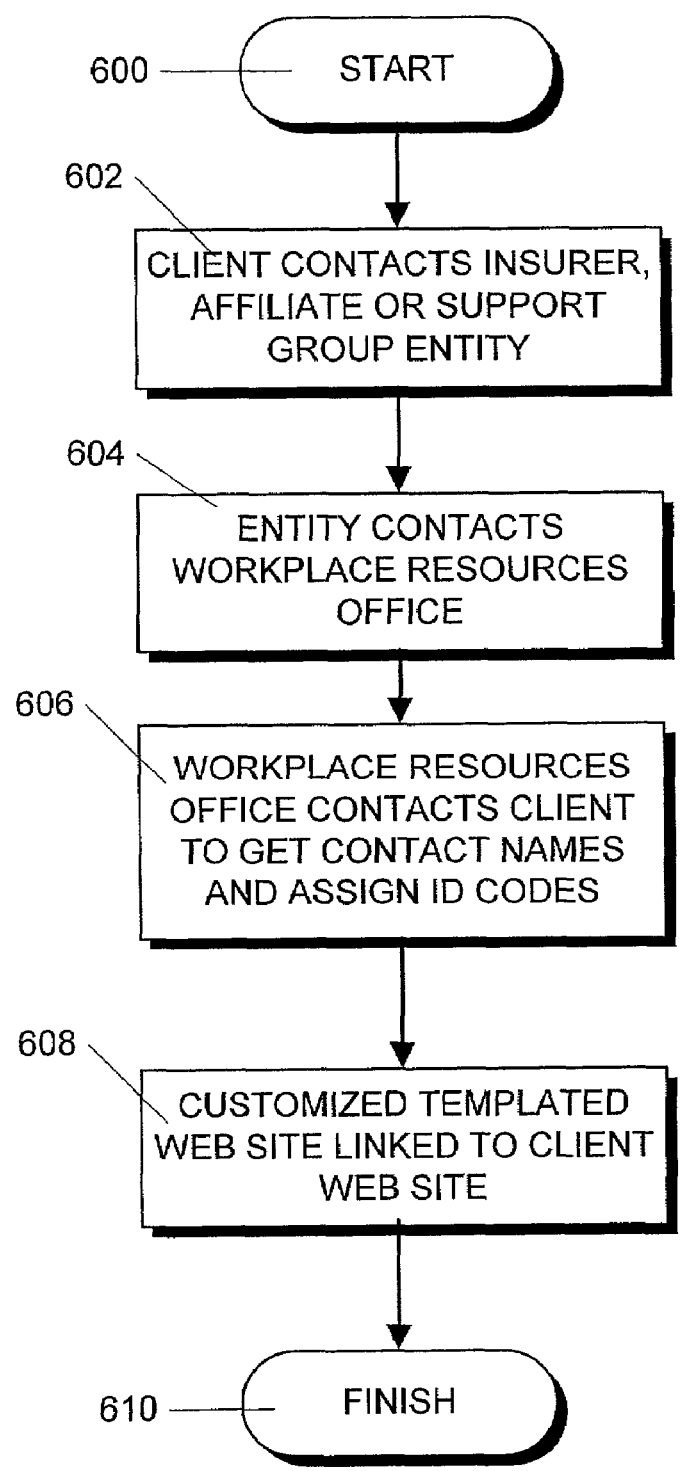
FIG. 6 is a flowchart showing the steps in an illustrative process for registering a client via an entity contact.

FIG. 6 illustrates steps in the process of registering a client with the workplace issue management system. In particular, this process starts in step 600 and proceeds to step 602 where a client contacts a subscriber to the system. This initial contact may be for purposes that are not directly related to workplace issues. For example, the client may contact an insurer, as indicated in step 602, for the purposes of obtaining liability insurance that covers employee suits, and the workplace issue services may be provided as part of the insurance package. Alternatively, the client may obtain services through a trade group affiliation or a support group that has subscribed to the services. In any case, in step 604, the entity that has subscribed to the services contacts the workplace resources office in order to establish an account for the client. In this process, the entity gives information to the workplace resources office that enables the workplace resources office to contact the client and obtain further information. Alternatively, client may directly contact the workplace services office in response to mailings or other advertising means. For example, the client may contact the workplace services office via a telephone call, via an on-line order form that is displayed in a web site or via a mail-in, or fax-in, order form.

In step 606, the workplace resources office contacts the client, generally by means of a telephone call, e-mail or fax, and obtains additional information. At this point, for example, contact persons for the client can be obtained and ID codes for those contact persons assigned to each contact person.

Next, in step 608, a customized templated web site may optionally be linked to the client web site. This linking may be performed such that the specialized web site appears as part of the client's own web site. In this case, the combined site is called a private web site. Alternatively, the specialized web site may be co-branded so that both the client's name and the workplace resources office name appear on the web site. Another alternative is that the specialized site is a stand-alone site and the site address (URL) is given to the client contacts.

Such a web site enables workplace issue information of a general nature to be immediately available or to be sent to the client on a periodic basis, for example monthly. Such information may include monthly updates, which include topics of particular interest to in-house personnel, web-based training, a library of workplace issue information, and recent legal cases involving workplace issue topics and other information. Because the web site is templated, the information may be remotely "published" by the workplace resources office by sending the content via the Internet directly to the site and loading the content directly into selected areas of the web site. This arrangement permits the publications to be carried out semi-automatically by the workplace resources office without requiring the office to enter each web site.

Figure 7:
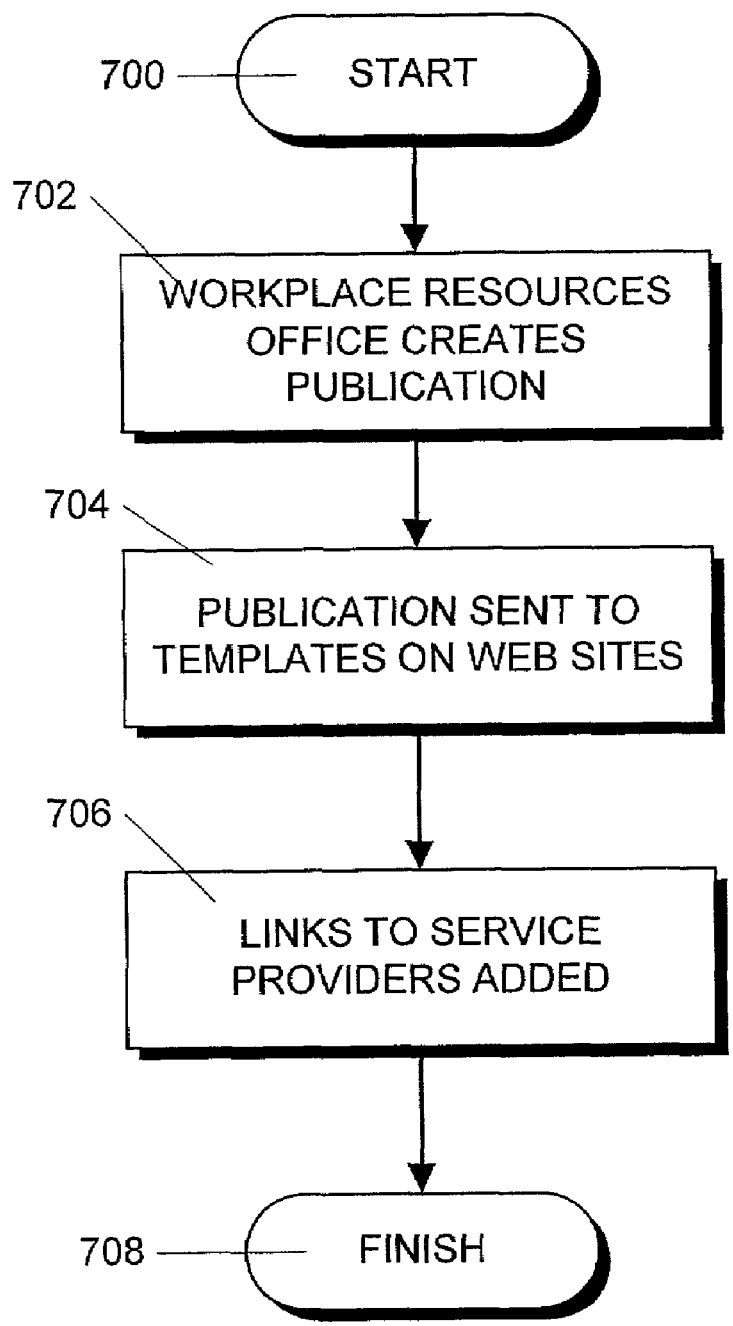
FIG. 7 is a flowchart showing the steps in an illustrative process for providing publications to clients on private or co-branded web sites.

FIG. 7 illustrates a process in which such publications are generated by the workplace resources office and published at each of the affiliated web sites. This process starts in step 700 and proceeds to step 702 where the workplace resources office creates a workplace issues publication, such as a monthly update, an alert or other publication. In step 704, this publication is sent to the templates on each web site, where the information is automatically loaded in and displayed at the web site. Optionally, as indicated in step 706, links may be added within the published content to particular service providers to allow a client to contact the service provider directly if there are questions concerning the published content. Additional functionality may be added to the publication, including interactive question and answer capability, request for topic specific information such as the "Case of the Month", etc. This interactivity allows the client to request specific information from the workplace resources office. This functionality and interactivity is then entered into appropriate fields in the client record in the knowledge management system so that future publications will also include this capability. The process then finishes in step 708.

Figure 8:
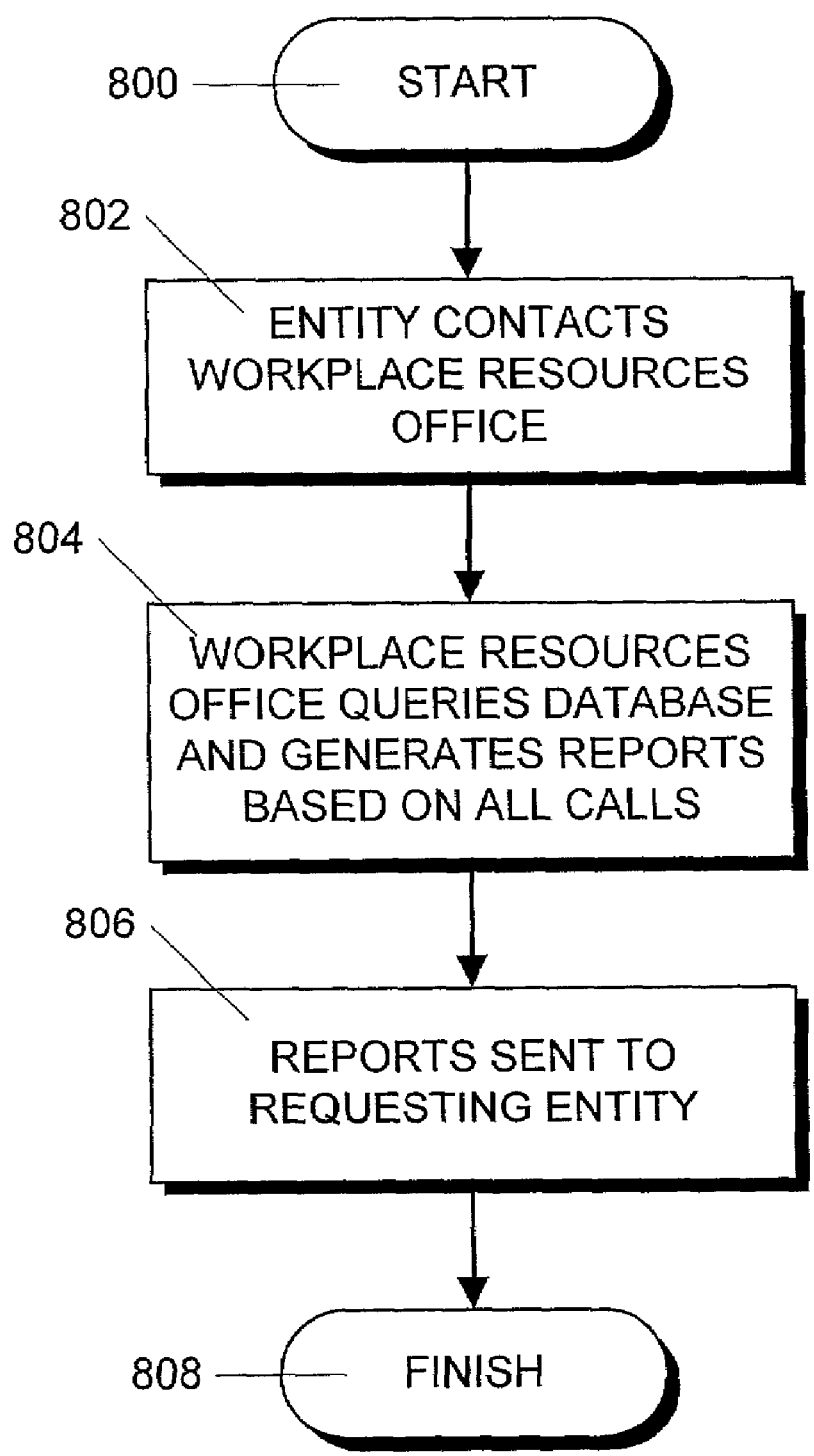
FIG. 8 is a flowchart showing the steps in an illustrative process for producing reports from the knowledge management system.

FIG. 8 illustrates a process by which entities such as insurers, affiliates, support groups or other entities may obtain information useful to the provision of services to clients. This process starts in step 800 and proceeds to step 802 where the entity contacts the workplace resources office. Next in step 804, the workplace resources office queries the database and generates reports that are based on actual calls, e-mails and other topic specific requests for assistance made by client contacts to the specialists. Care is taken however to avoid any information which would specifically identify a particular client unless that client already had a relationship with the requesting entity. However, since a large number of calls are made to the specialists by many clients, valuable statistical information can be gathered by processing the calls. Next in step 806, the reports are sent to the requesting entity and the process finishes in step 808.

A software implementation of the above-described embodiment may comprise a series of computer instructions either fixed on a tangible medium, such as a computer readable medium, e.g. a diskette, a CD-ROM, a ROM memory, or a fixed disk, or transmissible to a computer system, via a modem or other interface device over a medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web or cellular links.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to particular database tables and records, other database arrangements such as object-oriented databases or content addressed memory systems can also be used. Other aspects, such as the specific instructions utilized to achieve a particular function, as well as other modifications to particular processes or routines used to achieve a function are intended to be covered by the appended claims.

What is claimed is:

1. A method for managing workplace services provided by specialists to a plurality of users who are members of an organization by means of a computer system having a memory and connected to a network, the method comprising:
    (a) upon a request from the organization, using personnel in a workplace resources office who are familiar with the workplace services, but are not the specialists to contact the plurality of users and to obtain background information for the plurality of users and the organization;

(b) creating a database in the computer system memory, the database containing, for each of the plurality of users, user background information and user identifying information unique and specific to each user;

(c) connecting the workplace resources office to the computer system and the database via the network in order to store the background information for the plurality of users and the organization obtained by the workplace resources office in the database before a user contacts a specialist;

(d) before one of the plurality of users attempts to obtain specific assistance with any issue unique to their workplace and based on the background information, providing from the workplace resources office to that user, contact information which allows that user to immediately and directly contact a specialist with expertise specific to their unique workplace issues and who is not one of the workplace resources office personnel in order to establish a communication session during which the specialist provides assistance on a specific workplace issue to that user wherein, during each communication session, the specialist receives user identifying information from that user, uses the received identifying information to access and retrieve user background information for that user from the database via the network, which information was previously stored in step (c), and combines the background information with their specific expertise and any additional or corrected information provided by the user to provide specific, live assistance to the user concerning the specific and unique workplace issues; and (e) storing in the database over the network information concerning each communication session including the unique and specific advice provided to that user by the specialist and adding the unique and specific stored communication session information to the user background information for that user.

2. The method of claim 1 wherein the communication session is a telephone call.

3. The method of claim 1 wherein the communication session is an e-mail message.

4. The method of claim 1 wherein the network is the Internet.

5. The method of claim 1 wherein the user identifying information is a unique personal ID code.

6. The method of claim 5 wherein the workplace resources office assigns the personal ID code to each of the plurality of users.

7. The method of claim 1 wherein step (b) comprises:
(b3) establishing a web site connected to the database by the Internet; and
(b4) using the web site to collect the background information from each of the plurality of users.

8. The method of claim 7 wherein the web site assigns a personal ID code to each of the plurality of users.

9. The method of claim 1 wherein the specialist is connected to the database via the Internet and wherein in step (d) the specialist obtains the user identifying information verbally from the user, enters the user identifying information into the database via a web interface and receives the user background information via a web browser.

10. The method of claim 1 wherein in step (e) the specialist assigns the communication session information to one of a plurality of predefined categories and the assigned category is stored with the communication session information and the user background information.

11. The method of claim 10 further comprising:
(f) performing a query on information in the database, generating a report from the query and providing the report to the organization.

12. The method of claim 11 wherein the query is performed on category information in the database.

13. The method of claim 1 further comprising:
(g) using a workplace resources office to generate a templated web site that is accessible by the plurality of users via the Internet.

14. The method of claim 13 further comprising:
(h) publishing workplace issue information on the templated web site by sending the workplace issue information from the database to the templated web site.

15. The method of claim 1 further comprising:
(f) after a communication session between a user and the specialist, sending a follow-up message from the specialist to that user to inquire whether the assistance provided by the specialist answered a question posed by that user.

16. Apparatus for managing workplace services provided by specialists to a plurality of users who are members of an organization by means of a computer system having a memory and connected to a network, the apparatus comprising:

upon a request from the organization, a mechanism that uses personnel in a workplace resources office who are familiar with the workplace services, but are not the specialists to contact the plurality of users and to obtain background information for the plurality of users and the organization;

a database created in the computer system memory, the database containing, for each of the plurality of users, user background information and user identifying information unique and specific to each user;

a mechanism that connects the workplace resources office to the computer system and the database via the network in order to store the background information for the plurality of users and the organization obtained by the workplace resources office in the database before a user contacts a specialist;

a communication mechanism operable before one of the plurality of users attempts to obtain specific assistance with any issue unique to their workplace that, based on the background information, provides from the workplace resources office to that user, contact information which allows that user to immediately and directly contact a specialist with expertise specific to their unique workplace issues and who is not one of the workplace resources office personnel in order to establish a communication session during which the specialist provides assistance on a specific workplace issue to that user wherein, during each communication session, the specialist receives user identifying information from that user, uses the received identifying information to access and retrieve client background information for that user from the database via the network, which information was previously stored by the mechanism that connects the workplace resources office to the computer system and the database, and combines the background information with their specific expertise and any additional or corrected information provided by the user to provide specific, live assistance to the user concerning the specific and unique workplace issues; and a knowledge management system that, under control of the specialist, stores in the database over the network information concerning each communication session including the unique and specific advice provided to that user by the specialist and adds the unique and specific stored communication session information to the user background information for that user.

17. The apparatus of claim 16 wherein the communication session is a telephone call.

18. The apparatus of claim 16 wherein the communication session is an e-mail message.

19. The apparatus of claim 16 wherein the network is the Internet.

20. The apparatus of claim 16 wherein the user identifying information is a unique personal ID code.

21. The apparatus of claim 20 wherein the workplace resources office assigns the personal ID code to each of the plurality of users.

22. The apparatus of claim 16 further comprising:
a web site connected to the database by the Internet; and
a mechanism that connects each of the plurality of users to the web site in order to collect the background information from each of the plurality of users.

23. The apparatus of claim 22 wherein the web site assigns a personal ID code to each of the plurality of users.

24. The apparatus of claim 16 further comprising a web interface connecting the specialist to the database via the Internet so that the specialist obtains the user identifying information verbally from the user, enters the user identifying information into the database via a web interface and receives the user background information via a web browser.

25. The apparatus of claim 16 wherein the specialist uses the knowledge management system to assign the communication session information to one of a plurality of predefined categories and to store the assigned category with the communication session information and the user background information.

26. The apparatus of claim 25 further comprising:
a mechanism that performs a query on information in the database, generates a report from the query and provides the report to the organization.

27. The apparatus of claim 26 wherein the query is performed on category information in the database.

28. The apparatus of claim 16 further comprising:
a publication mechanism that generates a templated web site that is accessible by the plurality of users via the Internet.

29. The apparatus of claim 28 wherein the publication mechanism publishes workplace issue information on the templated web site by sending the workplace issue information from the database to the templated web site.

30. The apparatus of claim 16 further comprising means operable after a communication session between a user and the specialist, for sending a follow-up message from the specialist to that user to inquire whether the assistance provided by the specialist answered a question posed by that user.

31. A computer program product for managing workplace services provided by specialists to a plurality of users who are members of an organization by means of a computer system having a memory and connected to a network, and wherein upon a request from the organization, personnel who are familiar with the workplace services, but are not the specialists in a workplace resources office contact the plurality of users to obtain background information for the plurality of users and the organization, the computer program product comprising a computer usable medium having computer readable, program code thereon, including:
program code for creating a database in the computer system memory, the database containing, for each of the plurality of users, user background information and user identifying information unique and specific to each user;
program code for connecting the workplace resources office to the computer system and the database via the network in order to store the background information for the plurality of users and the organization obtained by the workplace resources office in the database before a user contacts a specialist;
program code operable before one of the plurality of users attempts to obtain specific assistance with any issue unique to their workplace and based on the background information, for providing from the workplace resources office to that user, contact information which allows that user to immediately and directly contact a specialist with expertise specific to their unique workplace issues and who is not one of the workplace resources office personnel in order to establish a communication session during which the specialist provides assistance on a specific workplace issue to that user wherein, during each communication session, the specialist receives user identifying information from that user, uses the received identifying information to access and retrieve user background information for that user from the database via the network, which information was previously stored by the program code for connecting the workplace resources office to the computer system and the database, and combines the background information with their specific expertise and any additional or corrected information provided by the user to provide specific, live assistance to the user concerning the specific and unique workplace issues; and
program code storing in the database information concerning each communication session including the unique and specific advice provided to a user by the specialist and adding the unique and specific stored communication session information to the user background information for the user.

32. The computer program product of claim 31 wherein the communication session is a telephone call.

33. The computer program product of claim 31 wherein the communication session is an e-mail message.

34. The computer program product of claim 31 wherein the network is the Internet.

35. The method of claim 1 wherein the workplace resources office is not part of the organization.

36. The method of claim 1 wherein the specialist is not part of the organization.

37. The apparatus of claim 16 wherein the workplace resources office is not part of the organization.

38. The method of claim 16 wherein the specialist is not part of the organization.

39. The computer program product of claim 31 wherein the workplace resources office is not part of the organization.

40. The computer program product of claim 31 wherein the specialist is not part of the organization.

41. The computer program product of claim 31 further comprising program code operable after a communication session between a user and the specialist, for sending a follow-up message from the specialist to that user to inquire whether the assistance provided by the specialist answered a question posed by that user.

42. A method for managing legal advice and counseling provided by legal experts to a plurality of contact people who are members of an organization by means of a computer system having a memory and connected to the internet, the method comprising:

(a) upon a request from the organization, using personnel in a workplace resources office who are familiar with the legal advice and counseling, but are not the legal experts to personally contact the plurality of contact people and the organization to obtain background information for the plurality of contact people and the organization;

(b) creating a centralized database in the computer system memory, the database containing, for each of the plurality of contact people, contact background information and contact identifying information unique and specific to each contact person;

(c) connecting the workplace resources office to the computer system and the database via the internet in order to store the background information for the plurality of contact people and the organization obtained by the workplace resources office personnel in the database before a contact person contacts a legal expert;

(d) before one of the plurality of contact persons attempts to obtain specific assistance with any issue unique to their workplace and based on the background information, providing from the workplace resources office to that contact person, contact information which allows that contact person to immediately and directly contact a legal expert with expertise specific to their unique workplace issues and who is not one of the workplace resources office personnel in order to establish a communication session during which the legal expert provides advice on a specific legal issue to that contact person wherein, during each communication session, the legal expert receives contact identifying information from that contact person, uses the received identifying information to access and retrieve contact background information for that contact person and for the organization from the database via the internet, which information was previously stored in step (c), and combines the background information with their specific expertise and any additional or corrected information provided by the user to provide specific, live advice to the contact person concerning the specific and unique legal issues; and (e) storing in the database over the network information concerning each communication session including the unique and specific advice provided to that contact person by the legal expert and adding the unique and specific stored communication session information to the user background information for that contact person and the organization.

43. The method of claim 42 wherein an insurer contracts with the workplace resources office and the organization is an insured of the insurer.

44. The method of claim 42 wherein the legal experts are associated with the workplace resources office.

45. The method of claim 42 wherein the contact people are employees of the organization.

46. The method of claim 42 further comprising:
(f) performing a query on information in the database;
(g) generating a report from the query; and
(h) generating a templated web site that is based on the report and is accessible by the plurality of contact people via the Internet.

47. The method of claim 42 further comprising:
(f) after a communication session between a contact person and the legal expert, sending a follow-up message from the legal expert to that contact person to inquire whether the assistance provided by the legal expert answered a question posed by that contact person.

* * * * *